(12) United States Patent
Liu et al.

(10) Patent No.: US 8,939,422 B2
(45) Date of Patent: Jan. 27, 2015

(54) SUPPORT DEVICE

(75) Inventors: Chun-Cheng Liu, New Taipei (TW); Yu-Hua Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 239 days.

(21) Appl. No.: 13/608,090

(22) Filed: Sep. 10, 2012

(65) Prior Publication Data

US 2014/0014802 A1 Jan. 16, 2014

(30) Foreign Application Priority Data

Jul. 16, 2012 (TW) .............................. 101125543 A (51) Int. Cl.
*F16M 13/00* (2006.01)

(52) U.S. Cl.
USPC ............ 248/397; 248/920; 248/121; 248/126

(58) Field of Classification Search
USPC ................. 248/397, 398, 127, 371, 126, 121, 248/122.1, 125.2, 125.3, 200, 218.4, 219.2, 248/917, 918, 919, 920, 921, 922, 923, 248/441.1, 447.2, 511, 512, 514, 516, 520, 248/370, 151, 140, 163.1, 440.1, 176.1, 248/200.1, 205.1, 229.13, 229.23, 226.11
See application file for complete search history.

(56) References Cited

U.S. PATENT DOCUMENTS

| | | | | |
|---|---|---|---|---|
| 2,488,305 A | * | 11/1949 | Manger et al. ................. | 292/275 |
| 3,119,591 A | * | 1/1964 | Malecki ......................... | 248/479 |
| 4,111,408 A | * | 9/1978 | Love .......................... | 269/289 R |
| 5,180,133 A | * | 1/1993 | Chang ............................ | 248/452 |
| 5,697,594 A | * | 12/1997 | Adams et al. ............... | 248/442.2 |
| 5,855,343 A | * | 1/1999 | Krekelberg .................... | 248/121 |
| 6,481,681 B1 | * | 11/2002 | Stunkel et al. ............ | 248/231.31 |
| 6,644,611 B1 | * | 11/2003 | Tai ............................ | 248/292.13 |
| 7,032,494 B2 | * | 4/2006 | Wygant ........................ | 89/37.04 |
| 7,066,664 B1 | * | 6/2006 | Sitoh et al. ...................... | 396/428 |
| 7,219,866 B2 | * | 5/2007 | Depay et al. .............. | 248/229.22 |
| 7,391,606 B2 | * | 6/2008 | Chen et al. ................ | 361/679.27 |
| 7,413,151 B2 | * | 8/2008 | Wu ................................ | 248/166 |
| 7,467,775 B2 | * | 12/2008 | Lu et al. ......................... | 248/663 |
| 7,516,933 B2 | * | 4/2009 | Moon et al. ................. | 248/441.1 |
| 7,744,055 B2 | * | 6/2010 | Zeng et al. ..................... | 248/447 |
| 7,984,883 B2 | * | 7/2011 | Li et al. ...................... | 248/125.7 |
| 8,220,767 B2 | * | 7/2012 | Lin ............................... | 248/370 |
| 8,248,791 B2 | * | 8/2012 | Wang et al. ............... | 361/679.59 |
| 8,282,060 B2 | * | 10/2012 | Fan ............................. | 248/291.1 |
| 8,297,565 B2 | * | 10/2012 | McLinda ....................... | 248/161 |
| 8,353,491 B2 | * | 1/2013 | Mezue ....................... | 248/205.1 |

(Continued)

FOREIGN PATENT DOCUMENTS

CN 201299349 Y 9/2009

*Primary Examiner* — Monica Millner
(74) *Attorney, Agent, or Firm* — Muncy, Geissler, Olds & Lowe, P.C.

(57) ABSTRACT

A support device is disclosed. The support device includes a connecting element and a first support frame. The connecting element is used for connecting the support device to a portable electronic device and includes a plurality of positioning protruding points. One end of the first support frame includes a positioning hole used for connecting to one of the plurality of the positioning protruding points; another end of the first support frame contacts a plane so that a clamping angle between the portable electronic device and the plane is formed, and the clamping angle is different if the positioning hole connects to different positioning protruding points.

6 Claims, 7 Drawing Sheets

(56) References Cited

U.S. PATENT DOCUMENTS

| | | | |
|---|---|---|---|
| 8,356,790 B2* | 1/2013 | Wu et al. .................... 248/688 |
| 8,514,568 B2* | 8/2013 | Qiao et al. ............... 361/679.59 |
| 8,599,570 B2* | 12/2013 | Ke et al. .................... 361/755 |
| 8,740,162 B1* | 6/2014 | Morgan .................. 248/231.51 |
| 2004/0035990 A1* | 2/2004 | Ackeret .................... 248/176.1 |
| 2004/0089778 A1* | 5/2004 | Valentine et al. ........ 248/229.13 |
| 2005/0056765 A1 | 3/2005 | Khor et al. |
| 2005/0230580 A1* | 10/2005 | Bryan et al. ............ 248/226.11 |
| 2006/0086871 A1* | 4/2006 | Joseph et al. .............. 248/178.1 |
| 2007/0090241 A1* | 4/2007 | Risse ........................... 248/214 |
| 2008/0061205 A1* | 3/2008 | Park et al. .................. 248/291.1 |
| 2008/0078793 A1* | 4/2008 | Brown ......................... 224/483 |
| 2008/0128571 A1* | 6/2008 | Dostaler et al. .......... 248/229.13 |
| 2009/0223102 A1* | 9/2009 | Li et al. ........................... 40/763 |
| 2009/0294607 A1* | 12/2009 | Klingel ...................... 248/205.1 |
| 2010/0012809 A1* | 1/2010 | Zeng et al. ..................... 248/351 |
| 2011/0034213 A1 | 2/2011 | Miroshnichenko |
| 2011/0155886 A1* | 6/2011 | Nakaniwa .................. 248/440.1 |
| 2011/0169384 A1* | 7/2011 | Padden et al. .............. 312/140.4 |
| 2011/0170246 A1* | 7/2011 | Chu ........................ 361/679.01 |
| 2012/0006962 A1* | 1/2012 | Lin ............................ 248/372.1 |
| 2012/0104195 A1* | 5/2012 | Da Costa Pito et al. ... 248/205.1 |
| 2013/0009024 A1* | 1/2013 | Liu ............................ 248/125.8 |
| 2013/0009031 A1* | 1/2013 | Cheng et al. .................. 248/371 |
| 2013/0233986 A1* | 9/2013 | Rasheta ...................... 248/205.1 |
| 2013/0341476 A1* | 12/2013 | Hazzard et al. .......... 248/231.31 |

* cited by examiner

SUPPORT DEVICE

BACKGROUND OF THE INVENTION

1. Field of the Invention

The present invention relates to a support device, especially to an easily-used support device which allows a portable electronic device to be positioned at several angles.

2. Description of the Related Art

With the rapid development of technologies, a main trend of electronic product development is to make the electronic products portable. Among these electronic products, more tablet computers (or smart phones) controlled by touch screens than traditional laptops are being selected by increasing numbers of users of consumer electronics and business-related workers because the touch-screen interface eliminates the need for a physical keyboard. Although tablet computers are light-weight and not cumbersome, users need to hold them with their hands in order to keep them upright or tilted so that the tablet computers are face-on to the users when being operated. Therefore, when compared with the traditional laptop computers from the past, the monitors of which stay upright or tilted when they are placed on a desktop or on a lap, the tablet computers are not in accordance with the general users' habits of using laptops, nor are they ergonomically sound. For this reason, in order to enable users to use tablet computers with more ease when it comes to long hours of use, support stands of all styles have been invented.

The support devices for supporting tablet computers are substantially categorized into support bases and support covers. Support bases have an advantage in that they can expand the functions of the tablet computers, but the volume of the support bases is quite large, and they are not convenient to carry. Support covers can protect the screen and the casing of tablet computers from being scratched when the users are not using the tablet computers. Support covers can also provide a support function when the users use the tablet computers. However, the range of angles formed by the support covers when supporting the tablet computers is limited, so the viewing angles that can be chosen by the user are quite few in number.

SUMMARY OF THE INVENTION

It is a primary object of the present invention to provide a support device that is easy to operate and can allow a portable electronic device to present a plurality of viewing angles.

To achieve the above object, a support device of the present invention is disclosed. The support device is used for supporting a portable electronic device, thereby forming a clamping angle between the portable electronic device and a plane. The support device includes a connecting element and a first support frame. The connecting element is used for connecting to the portable electronic device and includes a plurality of positioning protruding points. One end of the first support frame includes a positioning hole provided for connecting to one of the plurality of the positioning protruding points, and another end of the first support frame contacts the plane to support the portable electronic device, wherein the clamping angle is varied when the positioning hole is connected to different positioning protruding points.

According to one embodiment of the present invention, the connecting element includes an upper clip body and a lower clip body. The upper clip body is connected with the lower clip body, and the upper clip body and the lower clip body can be clipped to the portable electronic device by an elastic force, such that the connecting element detachably connects to the portable electronic device in clipping.

According to one embodiment of the present invention, the connecting element further includes an elastic member connected with the lower clip body for providing an elastic force.

According to one embodiment of the present invention, the first support frame includes an axle shaft, and the connecting element includes an axle hole, and the axle shaft is connected to the axle hole.

According to one embodiment of the present invention, the support device further includes a second support frame connected with the first support frame.

According to one embodiment of the present invention, the second support frame includes a chute and a convex dot, and the first support frame further includes a plurality of concave holes. The first support frame is connected to the chute, and the convex dot is used for engaging the plurality of concave holes.

According to one embodiment of the present invention, the first support frame or the second support frame has a non-slip plane.

According to one embodiment of the present invention, the lower clip body includes two curved planes, and the two curved planes allow the lower clip body to more closely attach to the portable electronic device when the upper clip body and the lower clip body are clipped to the portable electronic device.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENT

Figure 1:
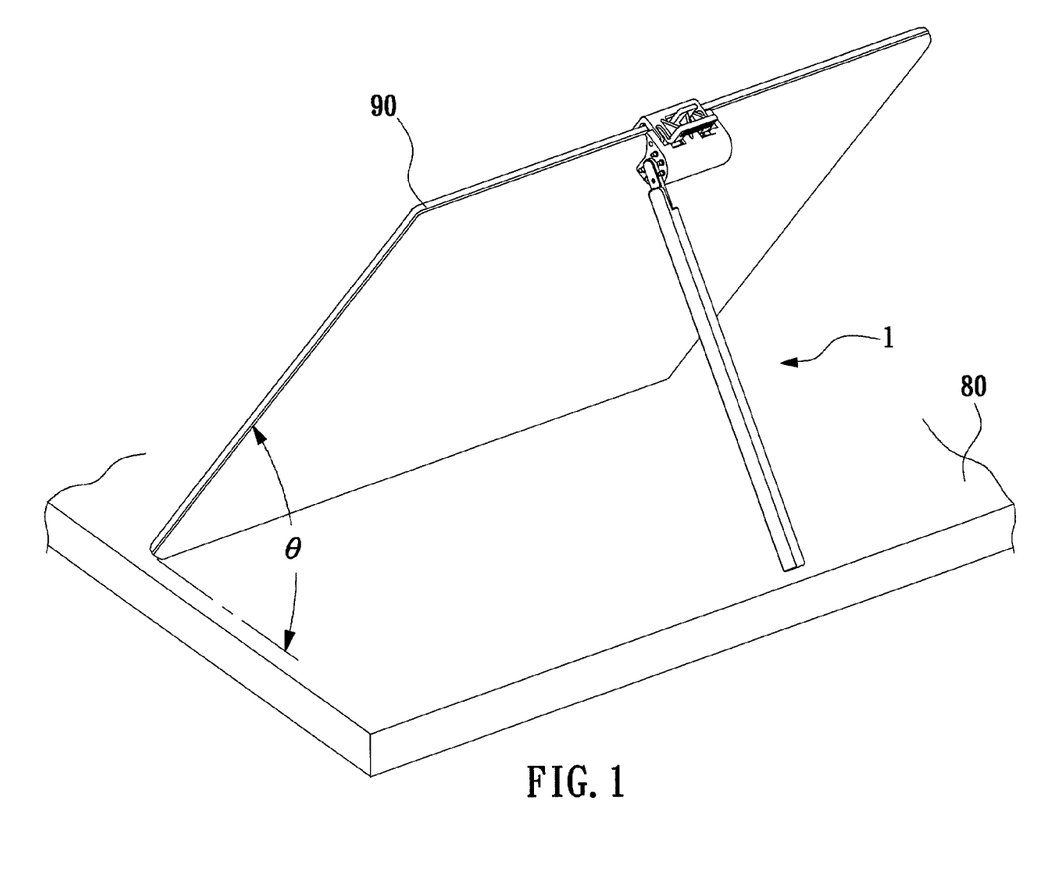
FIG. 1 is a back view diagram of a support device supporting a portable electronic device according to the present invention.

First, please refer to FIG. 1, which is a back view diagram of a support device supporting a portable electronic device according to the present invention.

As shown in FIG. 1, in one embodiment of the present invention, the support device 1 of the present invention is used for supporting a portable electronic device 90, such that the portable electronic device 90 can be placed on a plane 80 upright or slopingly to form a clamping angle θ between the display device and the plane 80. In a specific embodiment of the present invention, the portable electronic device 90 is a tablet computer, but the present invention is not limited to the aforementioned example; the portable electronic device 90 could also be a smart phone, a personal digital assistant, or other portable electronic products.

Figure 2:
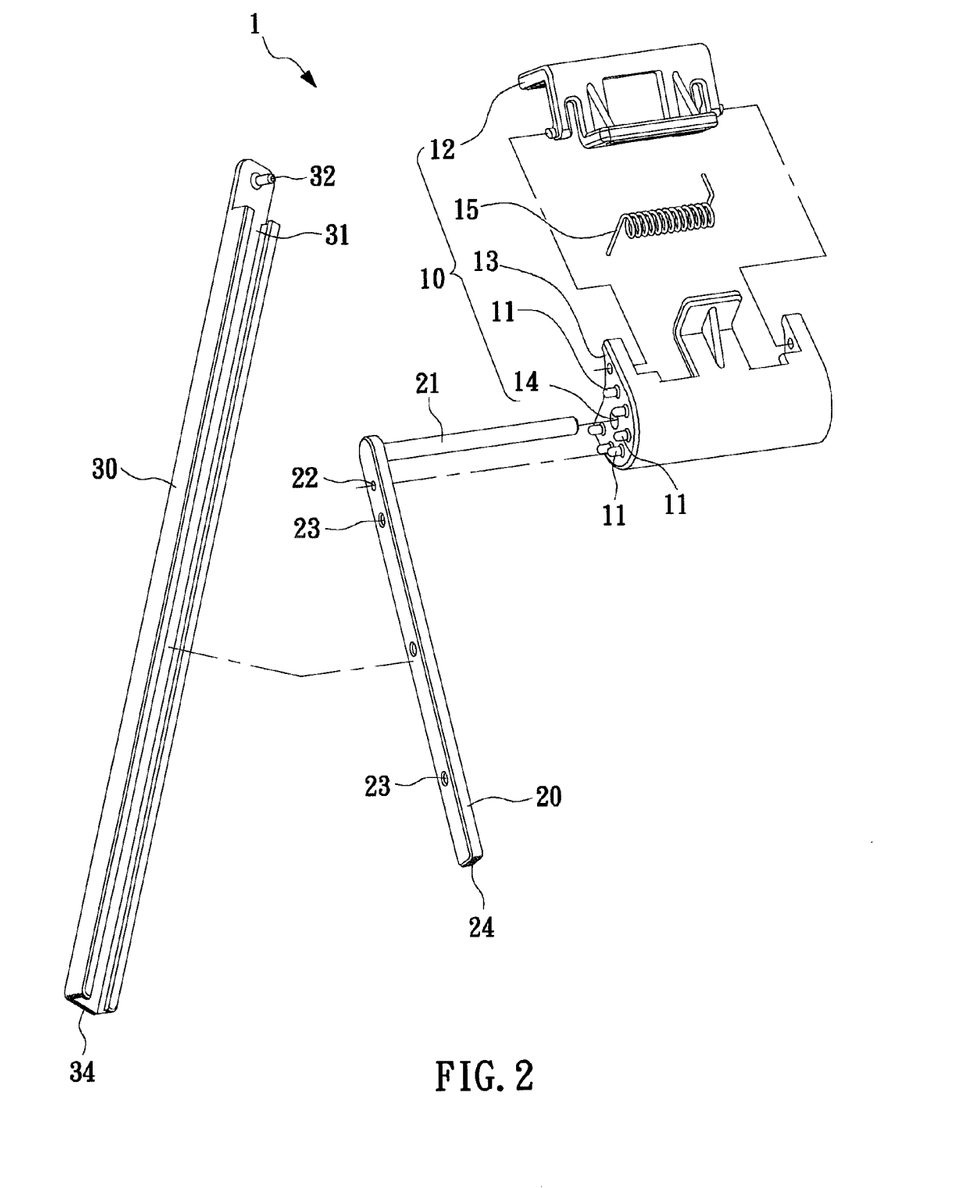
FIG. 2 is an exploded diagram of the support device according to the present invention.
Figure 3A:
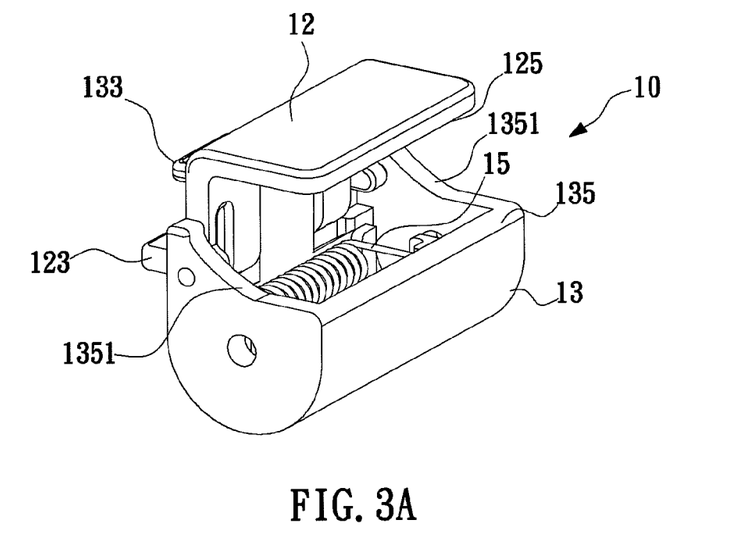
FIG. 3A is a back view diagram of a connecting element of the support device according to the present invention.
Figure 3B:
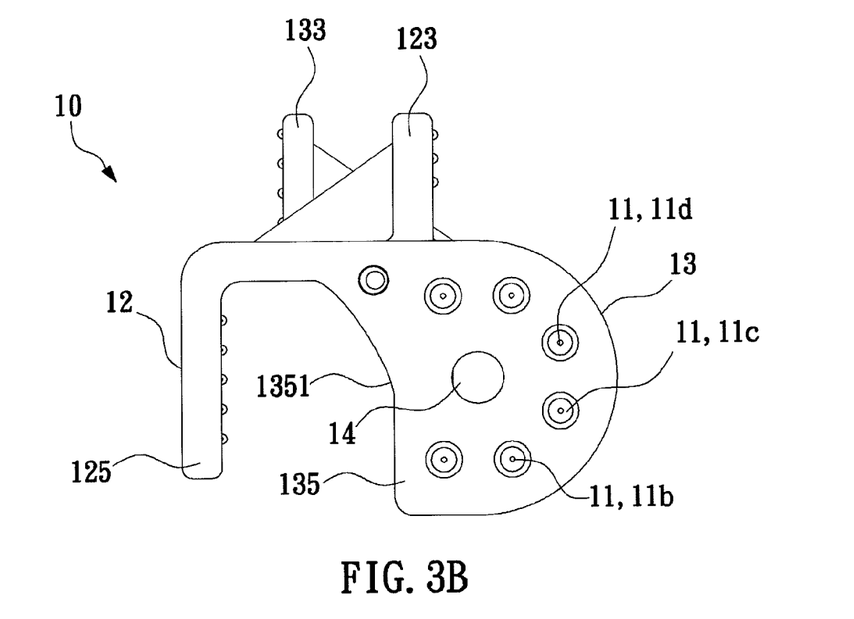
FIG. 3B is a side view diagram of a connecting element of the support device according to the present invention.

Next, please refer to FIG. 1, FIG. 2, FIG. 3A and FIG. 3B at the same time. FIG. 2-3B are structural schematic diagrams of the support device and its connecting element according to the present invention.

As shown in FIG. 2, in one embodiment of the present invention, the support device 1 of the present invention includes a connecting element 10, a first support frame 20, and a second support frame 30.

In one embodiment of the present invention, the connecting element 10 includes a plurality of positioning protruding points 11, an upper clip body 12, a lower clip body 13, an axle hole 14, and an elastic member 15.

As shown in FIG. 1, FIG. 3A, and FIG. 3B, in one embodiment of the present invention, the plurality of positioning protruding points 11 are disposed on the lower clip body 13. The upper clip body 12 is connected with the lower clip body 13. The upper clip body 12 includes a first pressing end 123 and a first clipping end 125, and the lower clip body 13 includes a second clipping end 135 having two curved surfaces 1351 and a second pressing end 133. The second pressing end 133 corresponds to the first pressing end 123, and a gap is kept between the first pressing end 123 and the second pressing end 133. In addition, the second clipping end 135 corresponds to the first clipping end 125, and a gap is also kept between the second clipping end 135 and the first clipping end 125. The first pressing end 123 and the second pressing end 133 are provided for users to press. When a user presses the first pressing end 123 and the second pressing end 133 inwardly, the gap between the first clipping end 125 of the upper clip body 12 and the second clipping end 135 of the lower clip body 13 will be increased, thereby being clipped to one side of the portable electronic device 90 (as shown in FIG. 1). When the upper clip body 12 and the lower clip body 13 are clipped to one side of the portable electronic device 90, the two curved surfaces 1351 allow the lower clip body 13 to attach the portable electronic device 90 more closely.

The axle hole 14 is disposed on the lower clip body 13, and the plurality of positioning protruding points 11 are disposed around the axle hole 14. The elastic member 15 is connected with the lower clip body 13, and the elastic member 15 is used for providing an elastic force, such that the upper clip body 12 and the lower clip body 13 can be clipped to the portable electronic device 90 via the elastic force provided by the elastic member 15. In a specific embodiment of the present invention, the elastic member 15 is a torsion spring, but the present invention is not limited to the aforementioned example.

As shown in FIG. 1 and FIG. 2, in one embodiment of the present invention, the first support frame 20 includes an axle shaft 21, a positioning hole 22, a plurality of concave holes 23, and a non-slip plane 24.

The axle shaft 21 is disposed on one end of the first support frame 20, and the axle shaft 21 is used for passing through the axle hole 14 so as to connect the first support frame 20 with the connecting element 10. The positioning hole 22 is used for female joining with one of the positioning protruding points 11, thereby fixing the first support frame 20. The non-slip plane 24 is disposed on a bottom surface of another end of the first support frame 20, and the non-slip plane 24 is used for increasing the friction force of the bottom surface.

As shown in FIG. 1 and FIG. 2, in one embodiment of the present invention, the second support frame 30 includes a chute 31, a convex dot 32, and a non-slip plane 34. The chute 31 is engaged with the first support frame 20, thereby connecting the second support frame 30 to the first support frame 20. The convex dot 32 is disposed on one end of the second support frame 30 for passing through the plurality of concave holes 23 to fix the first support frame 20. The non-slip plane 34 is disposed on a bottom surface of another end of the second support frame 30, and the non-slip plane 34 is used for increasing the friction force of the bottom surface.

Finally, please refer to FIG. 4 to FIG. 7, which are schematic diagrams of using the support device of the present invention.

Figure 4:
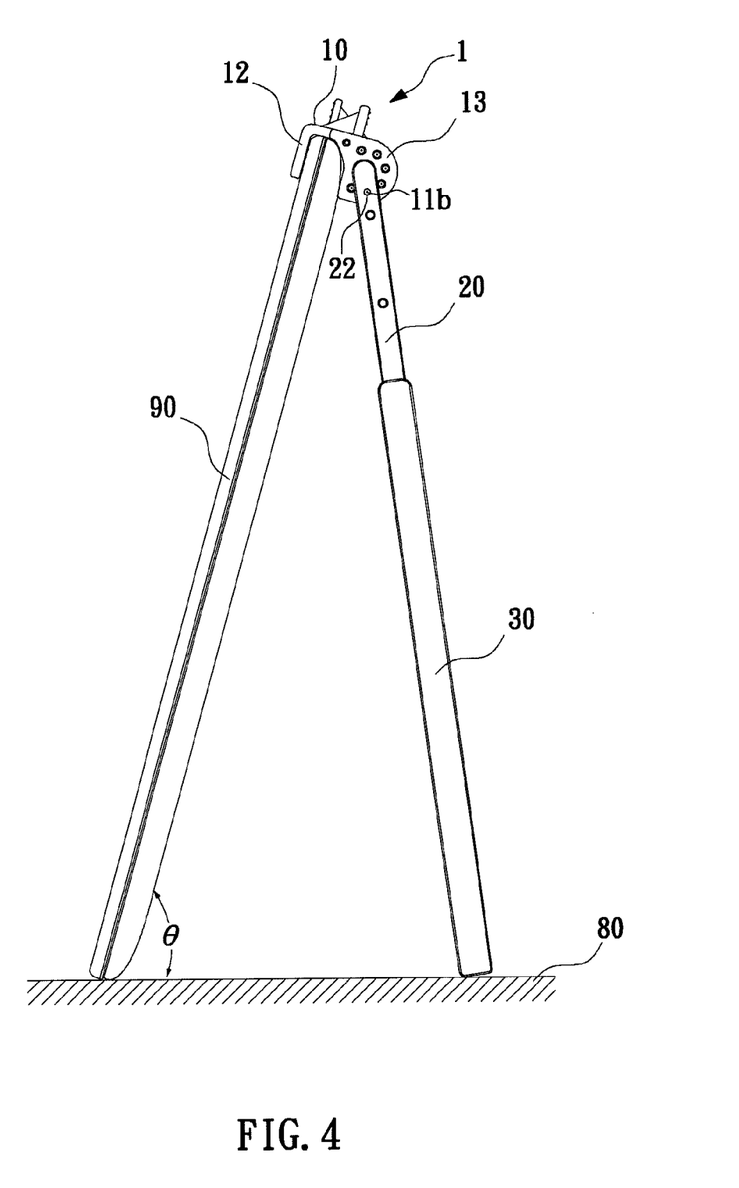
FIG. 4 is a first side view diagram of the support device supporting the portable electronic device according to the present invention.
Figure 5:
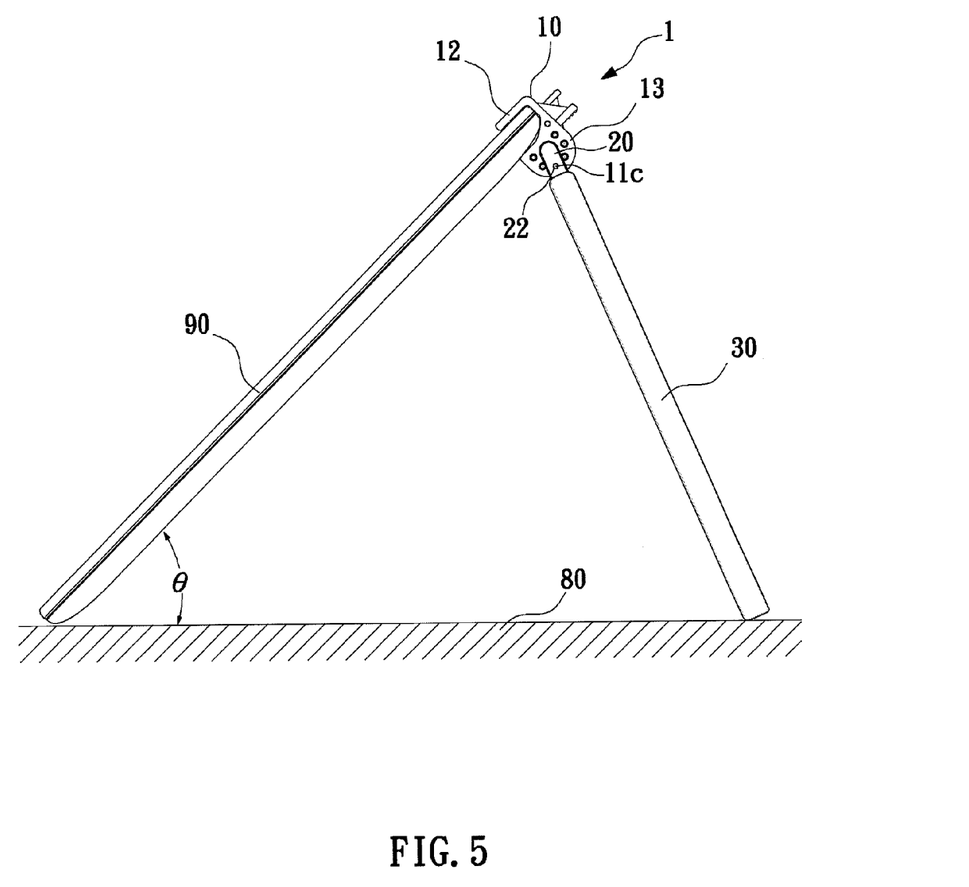
FIG. 5 is a second side view diagram of the support device supporting the portable electronic device according to the present invention.
Figure 6:
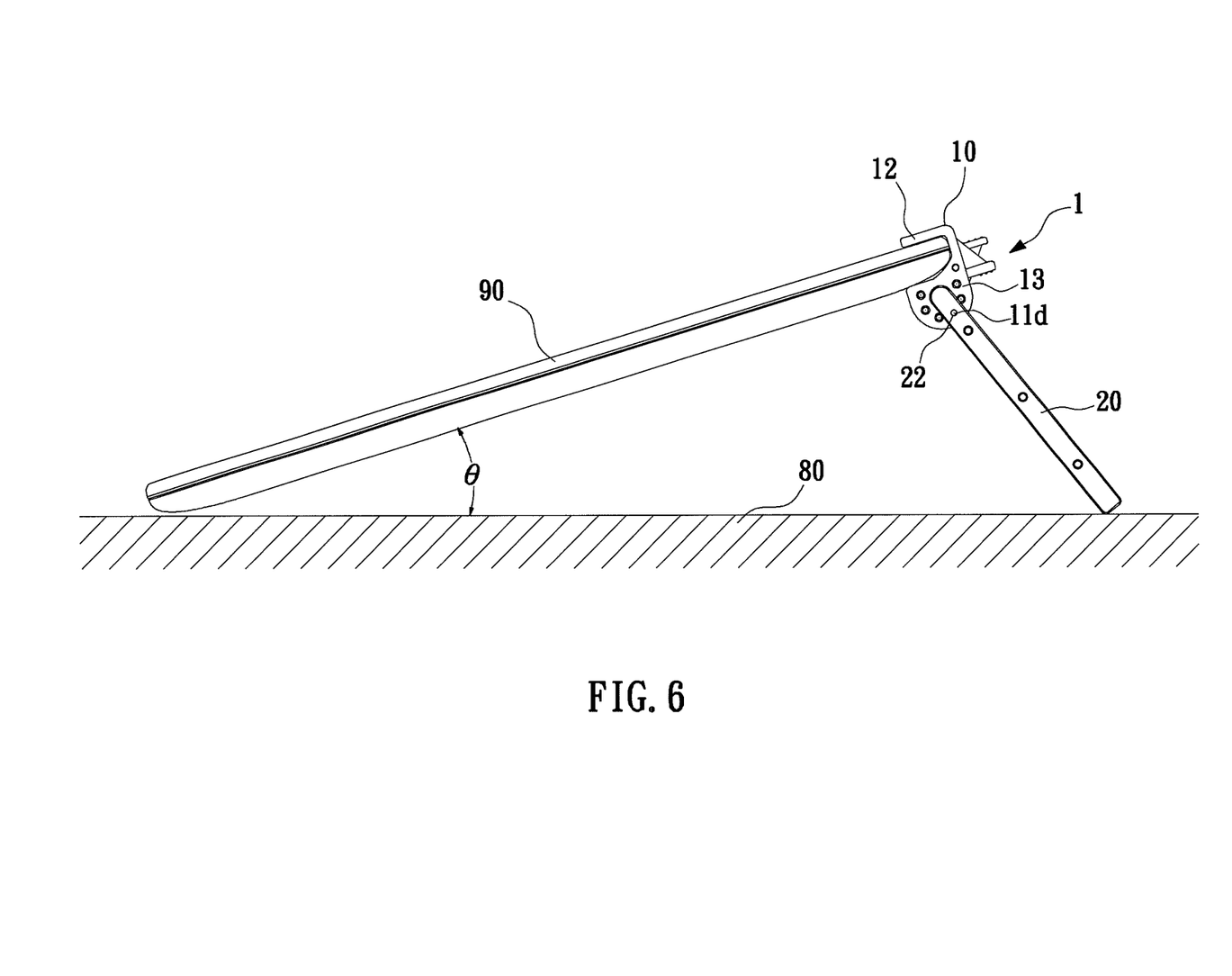
FIG. 6 is a third side view diagram of the support device supporting the portable electronic device according to the present invention.
Figure 7:
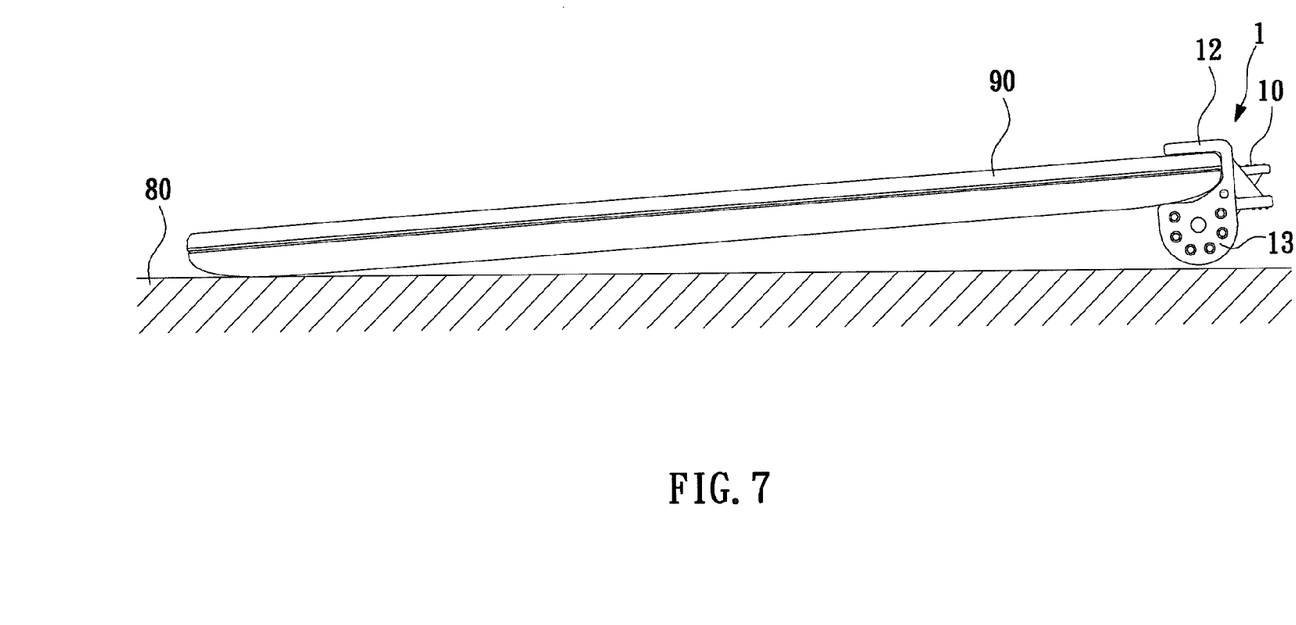
FIG. 7 is a fourth side view diagram of the support device supporting the portable electronic device according to the present invention.

As shown in FIG. 4 to FIG. 6, the clamping angle between the first support frame 20 and the portable electronic device 90 varies when the positioning hole 22 of the first support frame 20 is connected to different positioning protruding points 11. Thus, the clamping angle between the portable electronic device 90 and the plane 80 will have multiple variants when the positioning hole 22 is connected to different positioning protruding points 11 and the second support frame 30 is used at the same time. Take FIG. 4 as an example. When the positioning hole 22 is connected to the positioning protruding point 11b, i.e., the second positioning protruding point counted counterclockwise, the clamping angle θ between the portable electronic device 90 and the plane 80 is 75 degrees. At this moment, the first support frame 20 and the second support frame 30 are needed because the clamping angle θ is too great. Further take FIG. 6 as an example; when the positioning hole 22 is connected to the positioning protruding point 11d, i.e., the fourth positioning protruding point counted counterclockwise, the clamping angle θ between the portable electronic device 90 and the plane 80 is 17 degrees. In this situation, the use of the second support frame 30 is not necessary because the clamping angle θ is not great. Finally, when the first support frame 20 and the second support frame 30 are removed by the user, the portable electronic device 90 can also be supported by the connecting element 10 (as shown in FIG. 7).

In summary, regardless of the function, the method and result of the present invention are shown to have technical characteristics different from the prior arts, and said method and result constitute a significant advance in the field. It is hoped that the examiners will appreciate the novelty of the present invention and grant this patent so as to benefit society. However, the aforementioned embodiments are just for illustration of the principle and the result of the present invention and should not be construed to limit the range of the present invention. It will be obvious to those skilled in the art that, based upon the content herein, changes and modifications may be made without departing from the spirit and scope of the present invention. Therefore, the appended claims are intended to encompass within their scope all such changes and modifications as are within the true spirit and scope of the exemplary embodiments of the present invention.

What is claimed is:

1. A support device, for supporting a portable electronic device, such that a clamping angle is formed between the portable electronic device and a plane, the support device comprising:
   a connecting element, for connecting the portable electronic device, comprising a plurality of positioning protruding points; and a first support frame, one end of the first support frame comprising a positioning hole used for connecting to one of the plurality of the positioning protruding points, and another end of the first support frame used for contacting the plane to support the portable electronic device, wherein the clamping angle is varied when different positioning protruding points are connected to the positioning hole;

a second support frame, which is connected to the first support frame, wherein the second support frame comprises a chute and a convex dot, and the first support frame further comprises a plurality of concave holes; the first support frame is connected to the chute, and the convex dot is used for engaging the plurality of concave holes.

2. The support device as claim 1, wherein the connecting element comprises an upper clip body and a lower clip body; the upper clip body is connected with the lower clip body, and the upper clip body and the lower clip body are capable of clipping to the portable electronic device by an elastic force, such that the connecting element is detachably connected to the portable electronic device by clipping.

3. The support device as claim 2, wherein the connecting element further comprises an elastic member connected with the lower clip body for providing the elastic force.

4. The support device as claim 3, wherein the first support frame comprises an axle shaft, the connecting element comprises an axle hole, and the axle shaft is connected to the axle hole.

5. The support device as claim 4, wherein the first support frame or the second support frame has a non-slip plane.

6. The support device as claim 5, wherein the lower clip body comprises two curved planes, and the two curved surfaces allow the lower clip body to attach the portable electronic device more closely when the upper clip body and the lower clip body are clipped to the portable electronic device.

* * * * *